(12) United States Patent
Crawford et al.

(10) Patent No.: US 8,161,808 B2
(45) Date of Patent: Apr. 24, 2012

(54) EXHAUST TREATMENT DIAGNOSTIC SYSTEM AND METHOD

(75) Inventors: Kyle E Crawford, Howell, MI (US); Jason Daniel Mullins, Howell, MI (US)

(73) Assignee: GM Global Technology Operations LLC

(*) Notice: Subject to any disclaimer, the term of this patent is extended or adjusted under 35 U.S.C. 154(b) by 504 days.

(21) Appl. No.: 12/391,626

(22) Filed: Feb. 24, 2009

(65) Prior Publication Data

US 2010/0212417 A1   Aug. 26, 2010

(51) Int. Cl.
    G01M 15/10   (2006.01)
(52) U.S. Cl. .................................... 73/114.75
(58) Field of Classification Search ............... 73/114.69, 73/114.71, 114.75, 114.76
    See application file for complete search history.

(56) References Cited

U.S. PATENT DOCUMENTS

| 2008/0245058 A1* | 10/2008 | Boddy et al. ............... 60/286 |
| 2008/0282681 A1* | 11/2008 | Katou et al. ............... 60/286 |
| 2009/0199616 A1* | 8/2009 | Stark et al. ............... 73/1.73 |
| 2009/0211237 A1* | 8/2009 | Blomquist et al. ............... 60/317 |
| 2009/0248359 A1* | 10/2009 | Lin et al. ............... 702/182 |
| 2010/0031639 A1* | 2/2010 | Kwon ............... 60/286 |

FOREIGN PATENT DOCUMENTS

CN          863988 A       11/2006
WO      WO 2005033483       4/2005

* cited by examiner

Primary Examiner — Eric S McCall (57) ABSTRACT

A method and system for monitoring operation of an exhaust treatment system of a diesel engine includes a dosing system including an injector for injecting an injection fluid and a pump for pressurizing the injection fluid. The system also includes a pressure sensor in communication with the dosing system generating a pressure signal. The system further includes a control module that determines a pressure error signal in response to the pressure signal and generates a fault signal in response.

17 Claims, 8 Drawing Sheets

EXHAUST TREATMENT DIAGNOSTIC SYSTEM AND METHOD

FIELD

The present disclosure relates to vehicle exhaust systems, and more particularly to diagnosing operation of an exhaust treatment system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engine operation involves combustion that generates exhaust gas. During combustion, an air/fuel mixture is delivered through an intake valve to cylinders and is combusted therein. After combustion, the piston forces the exhaust gas in the cylinders into an exhaust system. The exhaust gas may contain emissions such as oxides of nitrogen ($NO_x$) and carbon monoxide (CO).

An exhaust treatment system is typically used to reduce vehicle emissions. A control module monitors engine operation and a dosing system selectively injects urea into the exhaust upstream from a catalyst. The treated exhaust reacts with the catalyst. A chemical reaction occurs that reduces emissions in the exhaust. More specifically, the chemical reaction decomposes the $NO_x$ and urea into separate elements. The urea decomposes into ammonia, which is stored on the surface of the catalyst. The ammonia stored on the catalyst reacts with $NO_x$ resulting in the formation of nitrogen and water. During cold-start periods, the exhaust temperatures are relatively low. $NO_x$ that is formed during the combustion process reacts with the ammonia that was previously stored on the catalyst surface. As a result, ammonium nitrite is deposited on the surface of the catalyst. The formation of ammonium nitrite occurs when ammonia exists on the catalyst surface and exhaust temperatures are below 60 degrees Celsius (60° C.). Ammonium nitrite is stable below 60° C. As the temperature of ammonium nitrite increases above 60° C., the compound decomposes. The decomposition of ammonium nitrite is highly exothermic and tends to increase catalyst temperatures.

The dosing system typically includes a urea supply and an injector. The urea delivered should be based on the level of emissions to effectively treat the exhaust gas. An insufficient treatment of the exhaust gas may be caused by a faulty injector or an insufficient supply of urea.

SUMMARY

Accordingly, the present disclosure provides a diagnostic system for an exhaust treatment system that treats exhaust gas exiting an internal combustion engine and that includes a dosing system that injects urea or another injection fluid into treat the exhaust gas.

In one aspect of the disclosure, a method of monitoring operation of an exhaust treatment system of an exhaust of an engine includes injecting injection fluid into the exhaust from an injector, thereafter, generating pressure signal corresponding to a given flow rate of injection, determining a pressure error signal in response to the pressure signal and generating a fault signal in response to the pressure error signal.

In another aspect of the disclosure, a system for monitoring operation of an exhaust treatment system of an engine includes a dosing system including an injector for injecting an injection fluid and a pump for pressurizing the injection fluid. The system also includes a pressure sensor in communication with the dosing system generating a pressure signal. The system further includes a control module that determines a pressure error signal in response to the pressure signal and generates a fault signal in response to the pressure error signal.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 1:
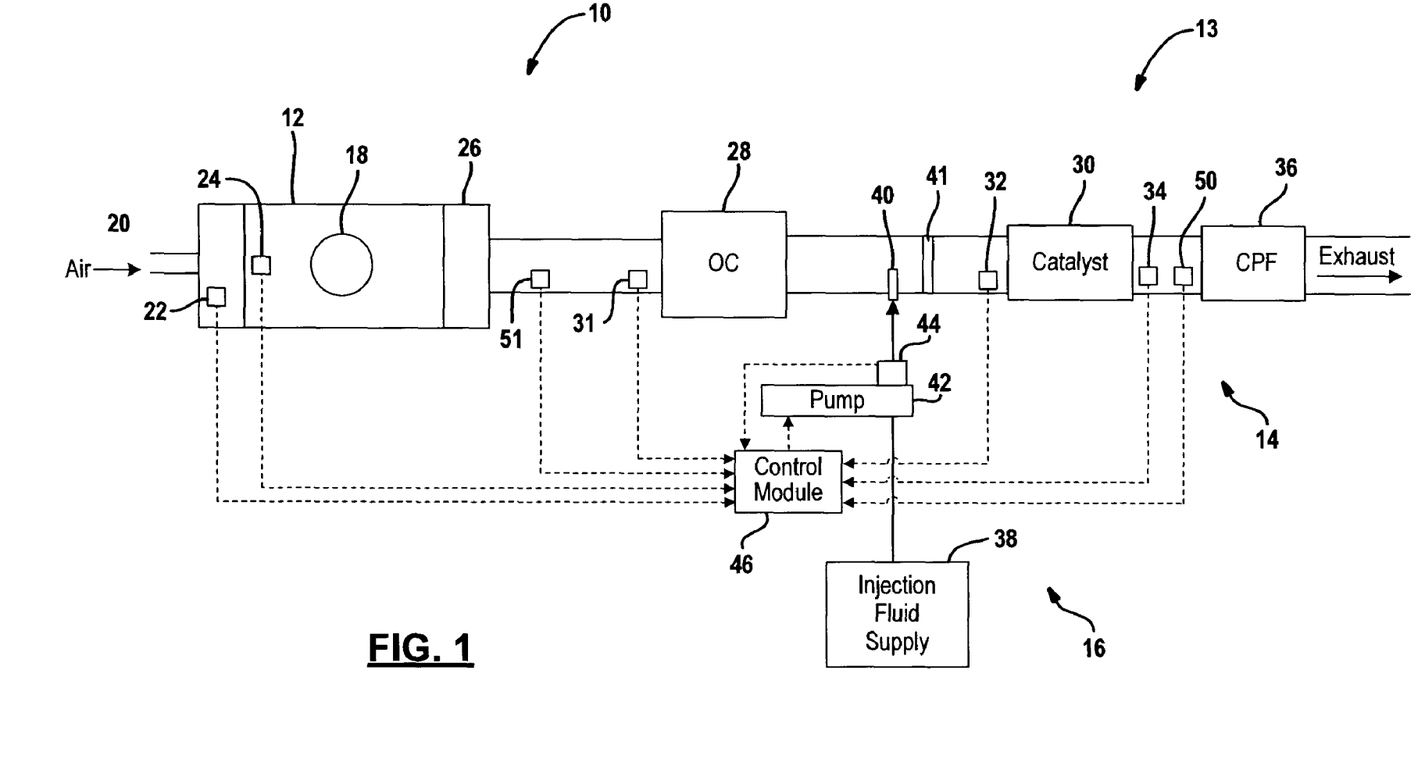
FIG. 1 is a functional block diagram of an engine system including an exhaust treatment system with temperature sensors integrated within a catalyst according to the present disclosure.

Referring now to FIG. 1, a diesel engine system 10 is schematically illustrated. The diesel engine system 10 includes a diesel engine 12 and an exhaust treatment system 13. The exhaust treatment system 13 further includes an exhaust system 14 and a dosing system 16. The diesel engine 12 includes a cylinder 18, an intake manifold 20, a mass air flow (MAF) sensor 22 and an engine speed sensor 24. Air flows into the engine 12 through the intake manifold 20 and is monitored by the MAF sensor 22. The air is directed into the cylinder 18 and is combusted with fuel to drive pistons (not shown). Although a single cylinder 18 is illustrated, it can be appreciated that the diesel engine 12 may include additional cylinders 18. For example, diesel engines having 2, 3, 4, 5, 6, 8, 10, 12 and 16 cylinders are anticipated.

Exhaust gas is produced inside the cylinder 18 as a result of the combustion process. The exhaust system 14 treats the exhaust gas before releasing the exhaust gas to the atmosphere. The exhaust system 14 includes an exhaust manifold 26 and a diesel oxidation catalyst (OC) 28. The exhaust manifold 26 directs exhaust exiting the cylinder towards the OC 28. The exhaust is treated within the OC 28 to reduce the emissions. The exhaust system 14 further includes a catalyst 30, preferably a selective catalytic reduction (SCR) catalyst, a temperature sensor 31, an inlet temperature sensor 32, an outlet temperature sensor 34 and catalyzed diesel particulate filter (CPF) 36. The OC 28 reacts with the exhaust gas prior to treating the exhaust to reduce emission levels of the exhaust. The catalyst 30 reacts subsequent to treating the exhaust to further reduce emissions.

The temperature sensor 31 may be positioned between the engine and the DOC 18. The inlet temperature sensor 32 is located upstream from the catalyst 30 to monitor the temperature change at the inlet of the catalyst 30, as discussed further below. The outlet temperature sensor 34 is located downstream from the catalyst to monitor the temperature change at the outlet of the catalyst 30, as discussed further below. Although the exhaust treatment system 13 is illustrated as including the inlet and outlet temperature sensors 32, 34 as being outside the catalyst 30, the inlet and outlet temperature sensors 32, 34 can be located internally with the catalyst to monitor the temperature change of the exhaust at the inlet and outlet of the catalyst. The CPF 36 further reduces emissions by trapping diesel particulates (i.e., soot) within the exhaust.

The dosing system 16 includes an injection fluid supply 38 that may be used for injecting urea from a tank and a dosing injector 40. The dosing system 16 injects injection fluid such as urea into the exhaust. The urea mixes with the exhaust and further reduces the emissions when the exhaust/urea mixture is exposed to the catalyst 30. A mixer 41 is used to mix the injection fluid such as urea with the exhaust gasses prior to the exhaust gases entering the catalyst.

A pump 42 is used to provide injection fluid from the injection fluid supply 38 to the injector 40. A pressure sensor 44 may be located within the pump or within the supply line to generate a pressure signal corresponding to the pressure provided by the pump. As will be described below, the pressure sensor 44 may provide an indication that the injector is not functioning properly, the line between the pump 42 and the injector 40 is impeded or kinked, that the injector is providing too much or not enough injection fluid, and may provide an indication for correcting the amount of dosing of injection fluid. The pressure sensor 44 provides an indication of the amount of pressure in the supply line and after injection the waves within the line provide further information as to the amount injected.

The control module 46 is also used to control the operation of the pump 42 to provide a predetermined amount of injection fluid through the injector 40. The control module 46 also receives feedback from the pressure sensor 44.

A control module 46 regulates operation of the engine system 10 and monitors operation of the dosing system 16. The control module 46 receives temperature signals from the temperature sensors 31, 32, 34.

Exhaust gas emission sensors 50, 51 may generate signals corresponding to the oxides of nitrogen ($NO_x$) or the amount of oxygen in the exhaust stream. The nitrogen signal may be communicated to the control module 46.

Figure 2:
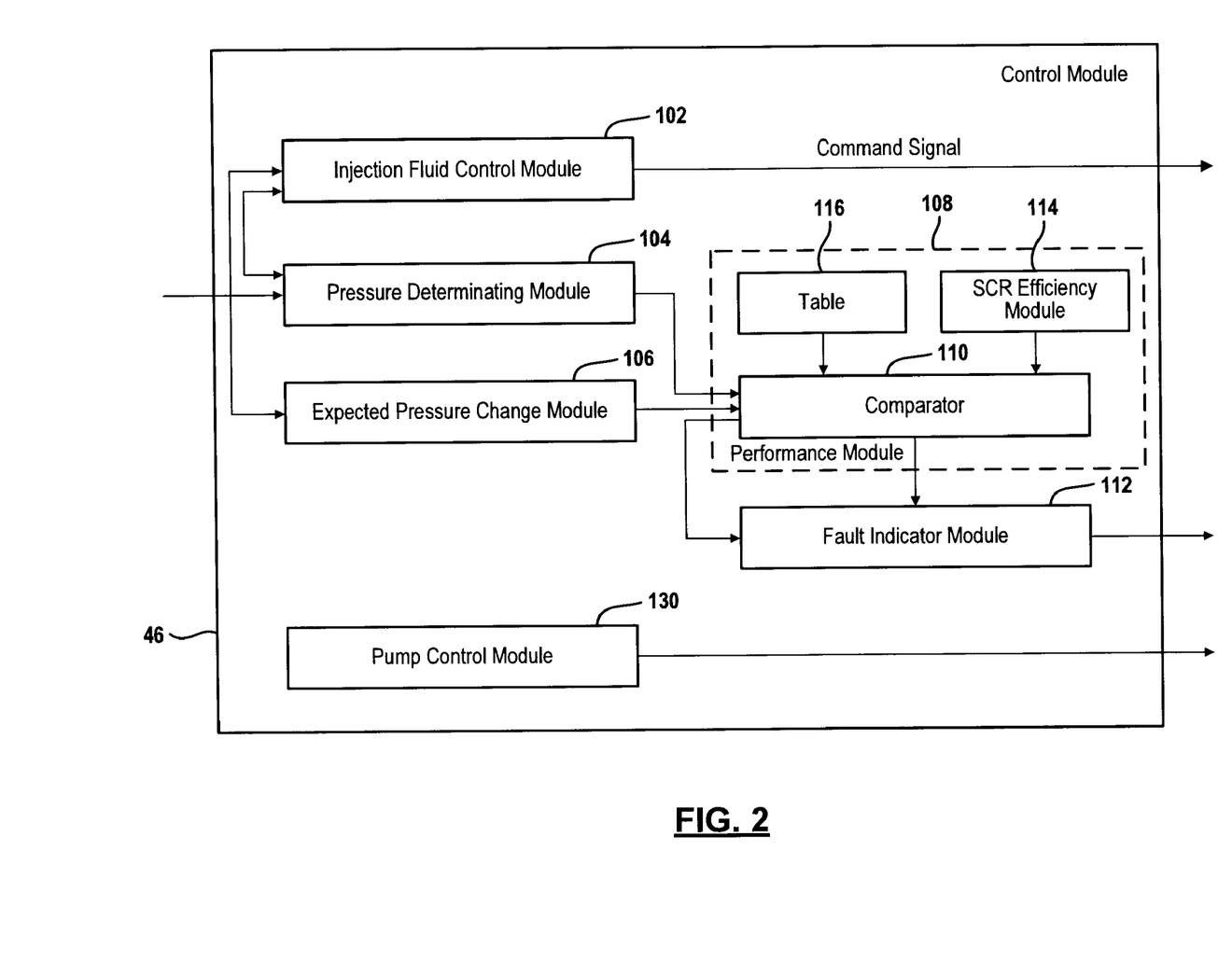
FIG. 2 is a functional block diagram of the control module of FIG. 1.

Referring now to FIG. 2, the control module 46 of FIG. 1 is illustrated in further detail. An injection fluid control module 102 is in communication with a pressure determination module 104. The injection fluid control module 102 controls the injector 40 that is used for injecting fluid into the exhaust. The injection fluid control module 102 may be controlled to inject an injection fluid such as urea into the exhaust stream to reduce the amount of emissions in a diesel engine. A command signal may be issued at the injection fluid control module to control the injector 40. The command signal, as will be described below can be adjusted in time, voltage, current, duty cycle or combinations thereof to control the dosing of injection fluid.

The pressure determination module 104 determines the pressure from the pressure sensor 44 of FIG. 1. As will be described below, feedback at the pressure signal at the pump may provided an indication of operation the actual operation of the injector and the dose provided at the injector.

An expected pressure change module 106 may receive pressure signals from the pressure determination module and determine an expected pressure change based upon an amount of injected fluid.

The expected pressure change module 106, the pressure determination module 104 and the injection fluid module 102 may all be in communication with a performance module 108 used to determine the performance of the selective catalytic reduction (SCR) catalyst. The performance module may include a comparator 110. The comparator 110 may compare an expected pressure change with a commanded dose in order to determine if a fault in the injector or dosing system is present. The comparator 110 may be in communication with a fault indicator module 112 that is used to generate a fault. Operation of the comparator 110 and the fault indicator module 112 will be described further below.

The comparator 110 may also receive a signal from an SCR efficiency module 114. The SCR efficiency module 114 may determine the efficiency of the SCR catalyst 30 by monitoring the $NO_x$ signal from the $NO_x$ sensor 50 illustrated in FIG. 2. When the efficiency is below a threshold, an indication of the beginning of a breakdown in the catalyst system is indicated.

A table 116 may also be coupled to the comparator 110. The table 116 may be used to store a comparison threshold or determine an indication of the correct dosing or pressure signal that corresponds to a particular dosing. The comparator then may compare the expected pressure signal with the actual pressure signal to determine an error or an offset.

A pump control module 130 may generate a control signal to provide pressurized dosing fluid to the injector.

Figure 3:
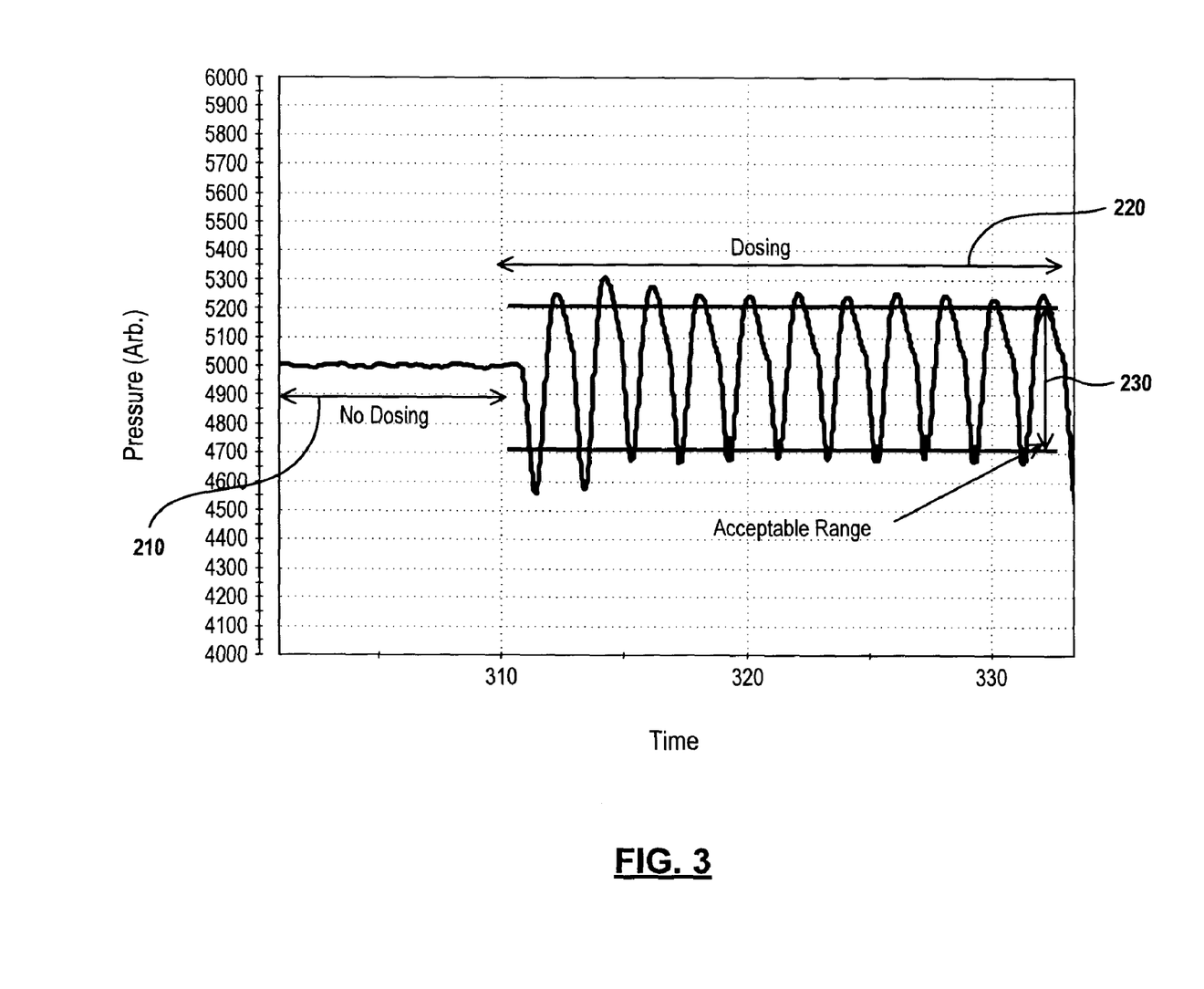
FIG. 3 is a plot of pressure versus time for dosing/no dosing of a pressure sensor in an injection system.

Referring now to FIG. 3, a plot of pressure versus time for a no-dosing period 210 versus a dosing period 220 is illustrated. During a no-dosing period an arbitrary level of pressure is provided in the system. During a dosing period, feedback to the pressure sensor provides an elevated amount of feedback to the pressure sensor. The pressure feedback signal includes pressure waves during the dosing period 220. An acceptable range 230 is provided. When the feedback signals meet or exceed the acceptable range, proper dosing from the injector 40 has been provided.

Figure 4:
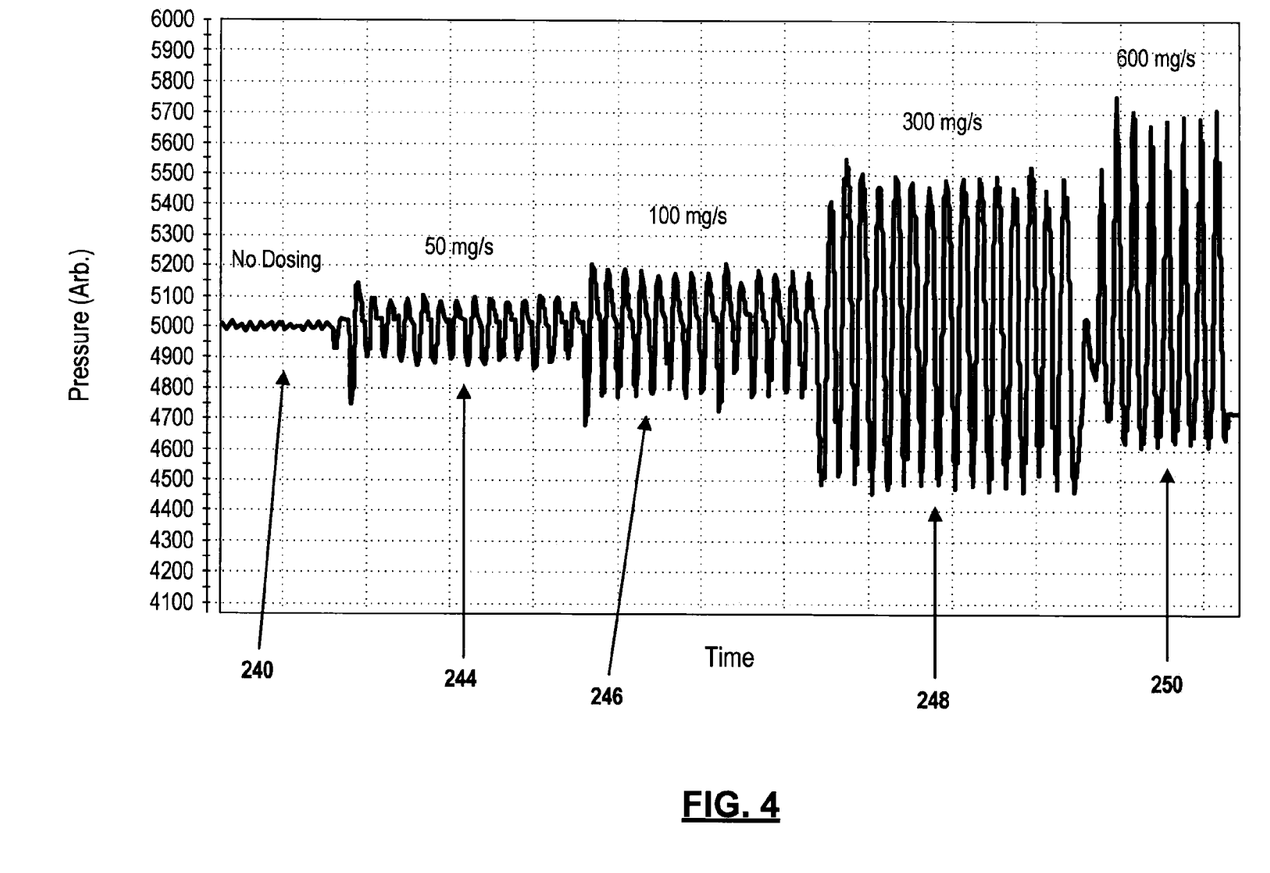
FIG. 4 is a plot of pressure versus time for various dosing amounts of an injection system.

Referring now to FIG. 4, various amounts of dosing correspond to the amplitude of the pressure signal fed back to the pressure sensor 44. The period 240 corresponds to a no-dosing period. The second period 244 corresponds to a time when a first dosing rate is provided. For example, only the first dosing rate may be 50 milligrams per second of dosing fluid. In period 246, 100 milligrams per second of dosing fluid is provided into the exhaust stream. In period 248, the injector provides a secondary rate. For example, only the second dosing rate of 300 milligrams per second of injection fluid is injected into the exhaust stream. In period 250, the injector 240 provides 600 milligrams per second of dosing fluid. As is mentioned above, the control module 46 of FIG. 2 controls a duty cycle, a voltage, a current or other control of the fuel injector to provide a predetermined amount of injected fluid.

Figure 5:
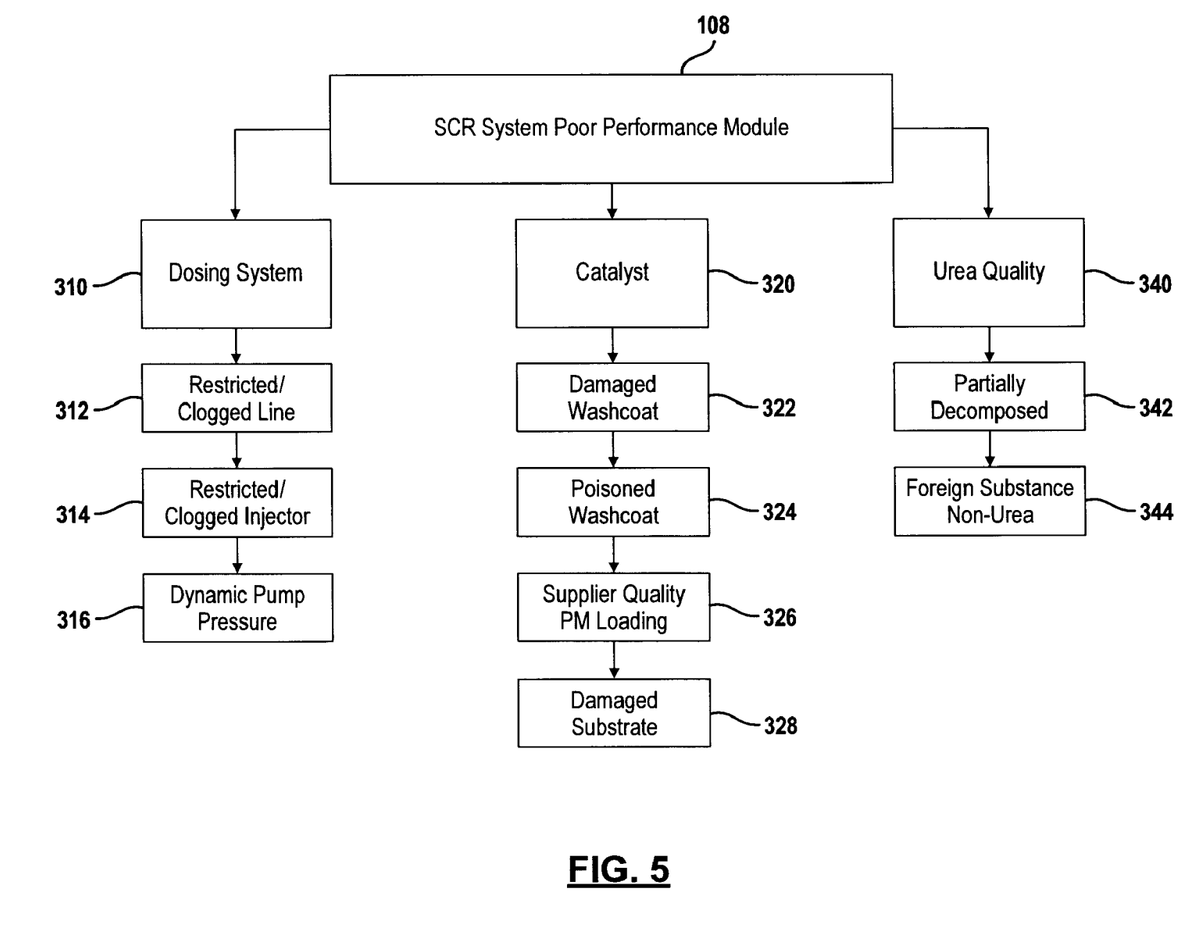
FIG. 5 is a flowchart illustrating steps executed by an exhaust treatment diagnostic system according to the present disclosure.

Referring now to FIG. 5, diagnosing which component has failed in an SCR system is difficult to diagnose. When the $NO_x$ conversion level falls below a threshold value, a determination of a failure must be indicated so the vehicle may be serviced. If the particular component of the SCR system is not diagnosed, the whole SCR system may be replaced. This may lead to undue expense since only a single component of the system may actually be under performing. In FIG. 5, the performance module log for the SCR system is illustrated in further detail. The performance module log may be used to predict the performance of various systems including the dosing system 310 which may include a restricted or clogged line between the injector and the pump 312, a restricted or clogged injector 314 or a dynamic pump pressure 316. That is, the pump may not be providing enough pressure to allow the injector to inject enough injection fluid into the exhaust.

The performance module 108 may also be used to predict the performance of a catalyst 320. The catalyst 320 may have various deficiencies including a damaged wash code 322, a poisoned wash code 324, a supplier quality or loading condition 326 or a damaged substrate 328.

The SCR performance module 108 may also be used to diagnose urea quality 340. The urea quality may include partially decomposed urea 342 or a foreign substance such as non-urea 344. The present disclosure concentrates on the dosing system.

Figure 6:
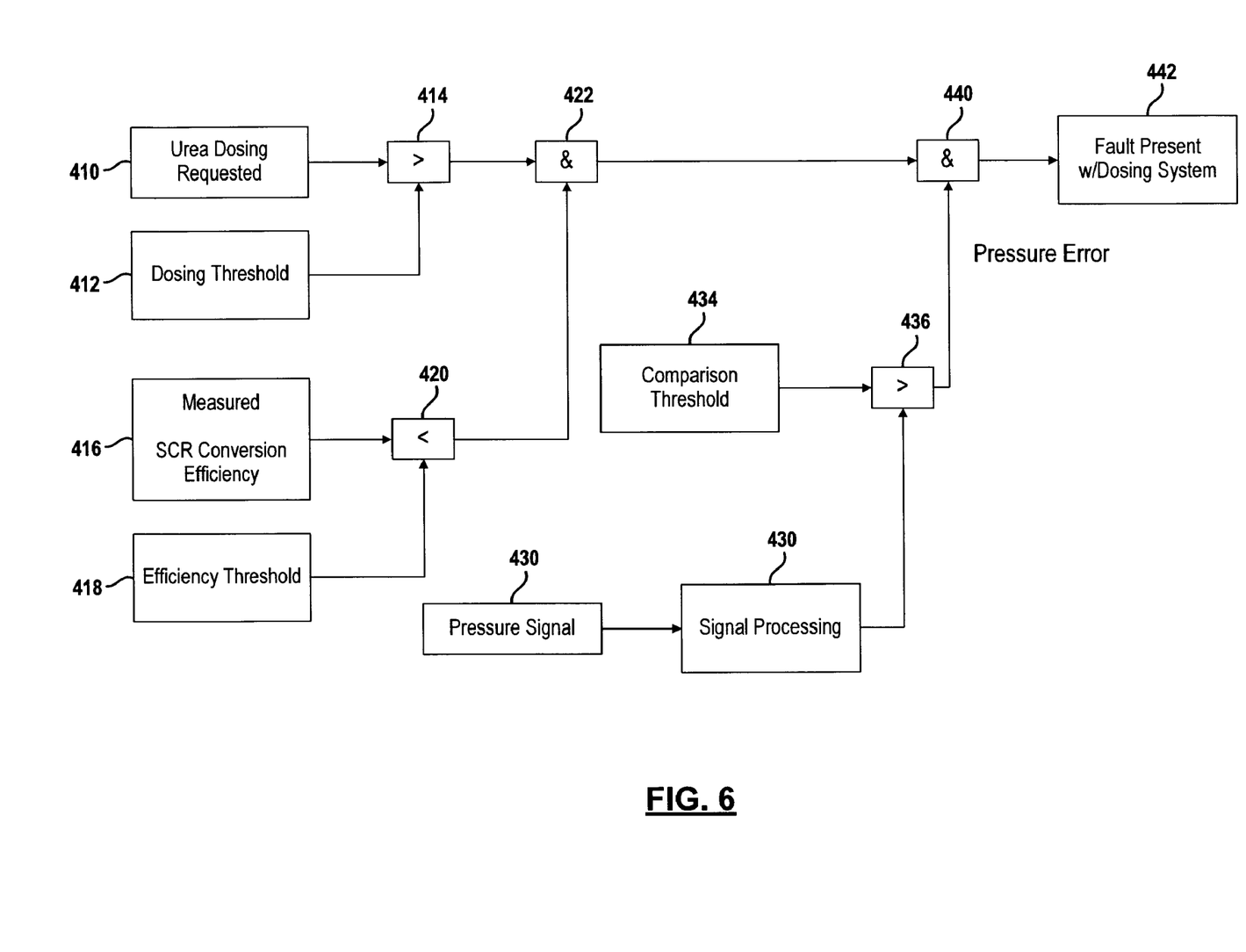
FIG. 6 is a flowchart illustrating steps executed by an exhaust treatment diagnostic system according to an alternative embodiment.

Referring now to FIG. 6, a method for determining whether the dosing system is performing properly is set forth. In step 410, it is determined whether or not a proper dosing request has been performed. In step 410, a dosing request is generated and compared to a dosing threshold of step 412. A comparator block 414 compares the dosing request and the dosing threshold. In step 416, the measured conversion efficiency of the catalyst is determined and compared to a threshold in step 418. The efficiency of the SCR conversion may be performed by monitoring the amount of $NO_x$ at the $NO_x$ sensor 50 illustrated in FIG. 1. The efficiency of the SCR is compared to an efficiency threshold from step 418 in step 420. When the dosing request is above a threshold indicating that dosing is being provided and the efficiency is less than a threshold in block 422, the system proceeds.

A pressure signal 430 from the pressure sensor is provided to signal processing 432. The signal processing provided by block 432 may include determining a range over time, a standard deviation or filtering such as high-pass filtering, low-pass filtering, band-pass filtering, or the like. The signal processing 432 may take place in the pressure determination module 104 of FIG. 2. A comparison threshold may be established in step 434. Block 436 compares the signal processed pressure signal with the comparison threshold of step 434. When the comparison threshold is greater than the processed pressure signal in step 436, step 440 proceeds with a fault when the pressure signal is below the comparison threshold and a urea dosing request is provided. A fault is indicated in step 442 when both of the conditions are present in step 440. The fault may be a visual indicator, an audible indicator or both.

Figure 7:
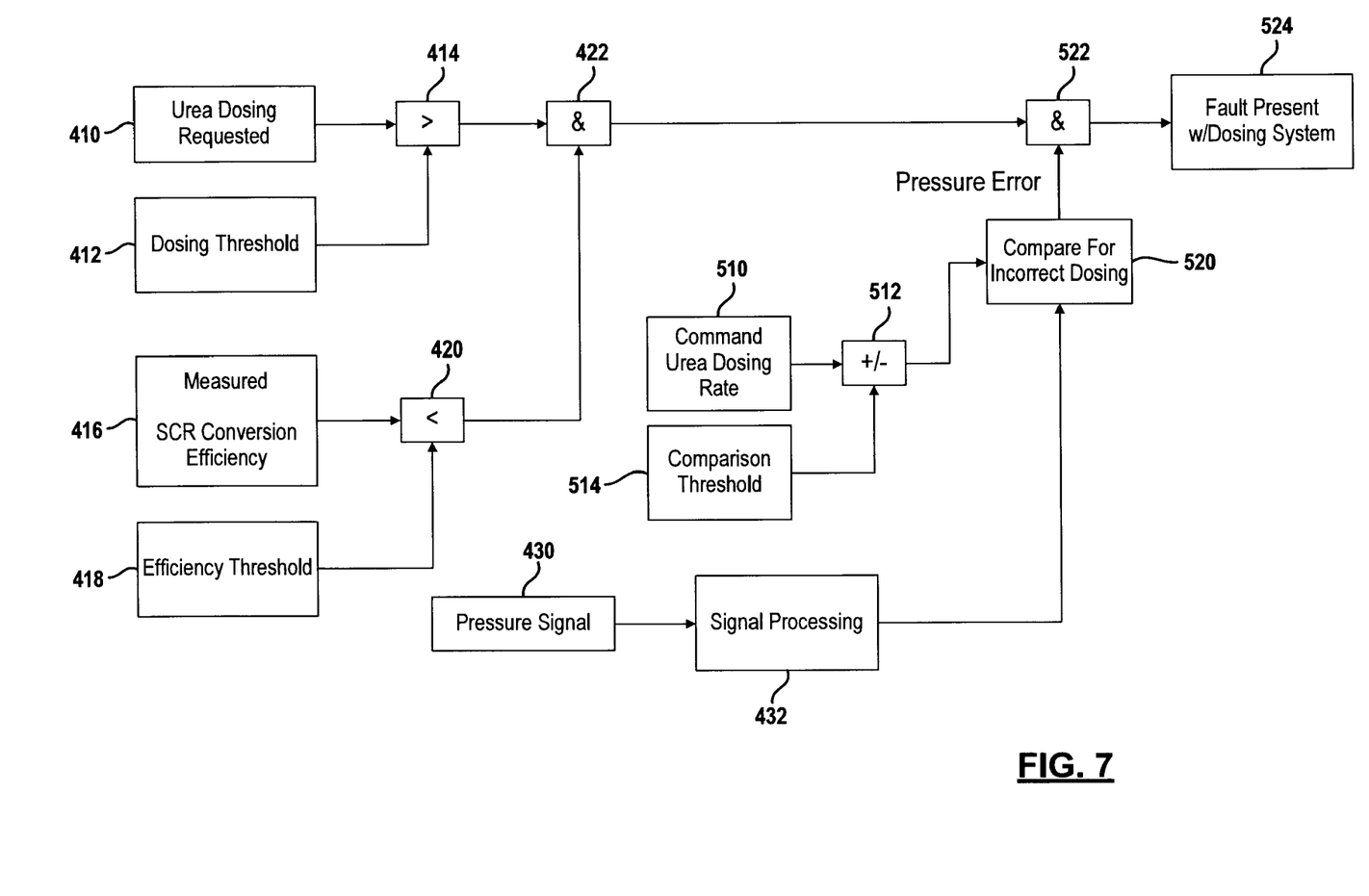
FIG. 7 is a flowchart illustrating steps executed by an exhaust treatment diagnostic system according to an alternative embodiment to yet another alternative embodiment.

Referring now to FIG. 7, a variation of the method of FIG. 6 is illustrated. In this embodiment, steps 410-422 are identical and therefore the description is not repeated. Also, steps 430 and 432 are also identical. In this embodiment, the goal is to diagnose if the injector has an error which causes doses to be too much or too little. Because the pressure feedback varies with the line length, the pressure waves received at the pressure sensor allow the actual amount of urea dosed versus what the system is commanded. Step 510 provides a commanded dosing rate to block 512. A comparison threshold is provided in step 514. The commanded urea dosing rate is compared with the comparison threshold in step 512. Step 512 may subtract or add the commanded urea dosing rate and the comparison threshold 514. In step 520, a comparison between the commanded dosing rate and the signal processed pressure signal is performed. When the requested amount of dosing does not correspond to the amount of feedback and a particular amount of dosing has been requested as is provided by step 442, step 522 compares the output of steps 422 and 520 to provide a fault in step 524 when an incorrect amount of injection fluid has been provided. The fault may be various types of faults including an audible fault, an indicator fault, or a fault message. In this manner, the SCR system may be serviced.

Figure 8:
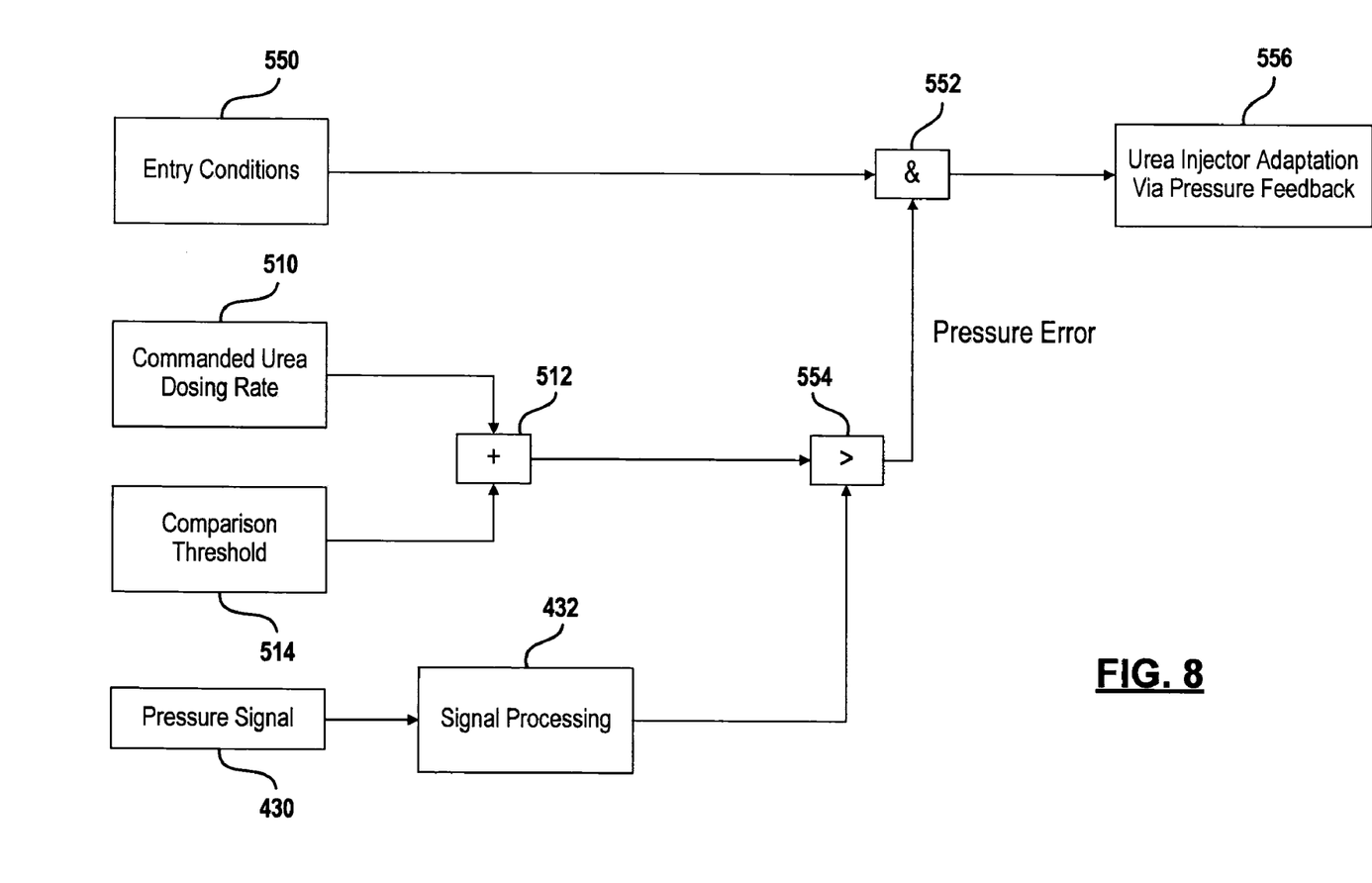
FIG. 8 is a flowchart illustrating steps executing an exhaust treatment and diagnostic system according to another alternative of the disclosure.

Referring now to FIG. 8, similar steps to those in FIGS. 6 and 7 have been labeled accordingly. In this embodiment, a correction factor may be provided for correcting the amount of dosed quantity. For example, a correction factor may be used to increase the amount of injector opening so that a predetermined amount of dosing is provided. A table may be established for various levels of dosing. The table values may be determined during calibration of the system during engineering development. Various systems with various size line lengths, types of injectors and types of pumps may require different calibrations. To enter the adaptation phase, entry conditions in step 550 must be met. Entry conditions may include poor conversion rates at the catalyst as indicated by the $NO_x$ sensor 50 of FIG. 1. Also, the various temperature signals from the exhaust system may also be used to provide entry conditions. Should the temperature signals be too high or too low, the entry conditions may be satisfied. A diagnostic system may also be entered periodically so that the system may be adjusted and calibrated. In step 552, when the entry conditions are met in step 550, and the commanded dose when compared to a comparison threshold is greater than the pressure signal in step 554, a correction factor or table of factors may be determined in block 556.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A diagnostic system for monitoring an exhaust system of an engine comprising:
   a dosing system including an injector for injecting an injection fluid into the exhaust system and a pump for pressurizing the injection fluid;
   a pressure sensor in communication with the dosing system generating a pressure signal; and a control module that determines a pressure error signal in response to the pressure signal, determines an efficiency of a selective catalytic reduction catalyst, and generates a fault signal in response to the pressure error signal and the efficiency.

2. A diagnostic system as recited in claim 1 wherein the dosing system includes:
a urea supply supplying urea; and
the injector that supplies the urea into said exhaust system.

3. A diagnostic system as recited in claim 2 wherein the injector is disposed between a diesel oxidation catalyst and the selective catalytic reduction catalyst.

4. A diagnostic system as recited in claim 2 wherein the injector is disposed between an oxidation catalyst and the selective catalytic reduction catalyst.

5. A diagnostic system as recited in claim 2 wherein the fault signal corresponds to a fault of the injector.

6. A diagnostic system as recited in claim 2 wherein control module generates a correction corresponding to the pressure error signal for the injection fluid.

7. A diagnostic system as recited in claim 1 wherein the pressure sensor is disposed in a fluid line.

8. A diagnostic system as recited in claim 1 wherein the pressure sensor is associated with the pump.

9. A method of monitoring operation of an exhaust treatment system of an exhaust of an engine, comprising:
injecting injection fluid into the exhaust from an injector;
thereafter, generating a pressure signal corresponding to a pressure within the exhaust treatment system;
determining an efficiency of a selective catalytic reduction catalyst;
determining a pressure error signal in response to the pressure signal; and
generating a fault signal in response to the pressure error signal and the efficiency.

10. A method as recited in claim 9 wherein injecting comprises injecting injection fluid into the exhaust prior to the selective catalytic reduction catalyst.

11. A method as recited in claim 9 wherein injecting injection fluid into the exhaust comprises injecting urea through an injector.

12. A method as recited in claim 11 wherein injecting injection fluid into the exhaust from an injector comprises injecting injection fluid from the injector disposed between a diesel oxidation catalyst and the selective catalytic reduction catalyst.

13. A method as recited in claim 11 wherein injecting injection fluid into the exhaust from an injector comprises injecting injection fluid from the injector disposed between an oxidation catalyst and the selective catalytic reduction catalyst.

14. A method as recited in claim 9 wherein generating a fault signal comprises generating the fault signal corresponding to a fault of the injector.

15. A method as recited in claim 9 further comprising generating a correction corresponding to the error signal.

16. A method as recited in claim 9 wherein generating a pressure signal comprises generating the pressure signal from a pump pressure sensor.

17. A method as recited in claim 9 wherein injecting fluid comprises injecting fluid in response to a command signal from a control module.

* * * * *